United States Patent
Selker

(10) Patent No.: US 6,549,219 B2
(45) Date of Patent: *Apr. 15, 2003

(54) PIE MENU GRAPHICAL USER INTERFACE

(75) Inventor: Edwin J Selker, Palo Alto, CA (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/288,670

(22) Filed: Apr. 9, 1999

(65) Prior Publication Data

US 2002/0122072 A1 Sep. 5, 2002

(51) Int. Cl.[7] .............................. G06F 3/00; G06F 3/14
(52) U.S. Cl. ..................... 345/834; 345/810; 345/811; 345/853; 345/902
(58) Field of Search .................. 345/809–811, 834–835, 345/841, 845, 846, 853, 854, 855, 902, 975

(56) References Cited

U.S. PATENT DOCUMENTS

| | | | | |
|---|---|---|---|---|
| 5,559,527 A | * | 9/1996 | Quinn ..................... | 345/902 X |
| 5,596,699 A | | 1/1997 | Driskell ..................... | 395/352 |
| 5,689,667 A | | 11/1997 | Kurtenbach ............... | 395/352 |
| 5,701,424 A | | 12/1997 | Atkinson ................... | 395/353 |
| 5,798,760 A | * | 8/1998 | Vayda et al. .............. | 345/834 |
| 5,828,360 A | * | 10/1998 | Anderson et al. .......... | 345/834 |
| 6,219,053 B1 | * | 4/2001 | Tachibana et al. ......... | 345/835 |
| 6,285,367 B1 | * | 9/2001 | Abrams et al. ............ | 345/854 |

OTHER PUBLICATIONS

IBM Technical Disclosure Bulletin, "Extended Pie Menu," Feb. 1994, IBM Corp., vol. 37, No. 02B, p. 397.*
Don Hopkins, "The Design and Implementation of Pie Menus," Dec. 1991, Dr. Dobb's Journal, 1–7.*
Lyons et al, "The Oval Menu—Evolution and Evaluation of a Widget," 1996, IEEE, p. 252–259.*

* cited by examiner

Primary Examiner—Cao H. Nguyen
Assistant Examiner—X L Bautista
(74) Attorney, Agent, or Firm—Lacasse & Associates, LLC; Randy W. Lacasse; Daniel E. Johnson

(57) ABSTRACT

A graphical user interface includes a plurality of pie menu levels concentrically arranged. Located within the center most section are menu selections generally of greater importance, highest probability of use, historical favorites, category headings, tabs from a tab menu, as well as other high level menu items. Levels extending from the center decrease in frequency of use while increasing in granularity of menu items. Variations in geometric shapes, number of divisions, levels, use of color or texture enhance the use of the pie menus.

19 Claims, 5 Drawing Sheets

FIG. 9

PIE MENU GRAPHICAL USER INTERFACE

BACKGROUND OF THE INVENTION

1. Field of Invention

The present invention relates generally to the field of graphical user interfaces (GUIs). More specifically, the present invention is related to multiple level pie menus.

2. Discussion of Prior Art

A goal of software producers is not only to produce a great source code which operates without error, but also to produce a product which the consumer interacts with quickly and easily. Graphical user interfaces, such as icons, cursors, pop-up windows, and menus, have always played a large part in elevating the user's ease of interaction with the software program.

Traditional menu systems arrange a list of selections in a top-to-bottom linear configuration. The user typically uses the keyboard or mouse to point to a desired menu item. Popular selections are frequently placed at the top, with a descending order of usage for the remaining items. However, when a list of menu items becomes long, it becomes difficult for the average user to quickly review the list and even more difficult to recall from prior selections the exact content and positions of menu items. Prior art systems break the list into multiple smaller lists. In some cases, the lists are organized by general menu headings. Upon selection of a specific general heading, an additional menu list referred to as a "child menu" becomes visible on the user's screen. Usually the second list represents more specific items within the general menu headings and partially overlaps the originally selected menu item.

Problems with linear list menus are many. First of all, people are generally bad with lists. A grocery list is good for a few items, however as the list becomes longer, the first few items are remembered, with the lower items being forgotten. As the list becomes longer, the ease of memory recall becomes increasingly more difficult. When selecting items from a long list, the bottom items require traversal of the list from top-to-bottom, therefore creating a distance and consequentially time delay effect on menu selections. What is needed is a distance and time invariant arrangement.

Pie menus have long been known as a method of quick object selection. In a pie menu, a user's cursor located at the center is distance invariant, i.e. the distance to select any one menu item is the same. Pie menus typically reduce selection time by 15% or more. The benefits and weaknesses of pie menus over traditional linear menus has been described in a publication by Hopkins, P., entitled "Direction Selection is Easy as Pie Menus" and found in the periodical Computer Graphics Workshop, Oct. 10, 1997.

Problems with pie menus center around the limited curve drawing abilities of prior art computer displays in combination with a general limitation on the number of slices any pie can have without producing a confused or crowded menu for the user. Eight or less pie slices are generally required to keep an uncluttered, easy to use pie menu. The prior art has resorted to placing additional menu items in separate charts either in parallel or in a visually overlapping hierarchical relationship. Other variations include a combination pie menu and linear menu arrangement. Each of these solutions decreases the benefits of the basic pie menu and significantly increases distance and time requirements. Examples of prior art systems are described below.

The patent to Driskell (U.S. Pat. No. 5,596,699) provides for a Linear-Viewing/Radial-Selection Graphic For Menu Display. This reference discloses a menu display system which displays menu options according to their frequency of selection (see abstract and claim 8). Driskell is limited by the continued use of linear list configurations.

The patent to Kurtenbach (U.S. Pat. No. 5,689,667) provides for a Methods And System Of Controlling Menus With Radial And Linear Portions. This reference discloses a menu system which groups menu items based on their frequency of selection. As with the Driskell reference, Kurtenbach retains menu selections in a linear list arrangement.

The patent to Atkinson (U.S. Pat. No. 5,701,424), assigned to Microsoft Corporation, provides for a Palladian Menus And Methods Relating Thereto. This reference discloses a menu in which high frequency commands are placed within wedges of the circular portion of a pie shaped menu. While arranging the first level of menus in a Palladian profile, second level menus retain the prior art linear lists of menu items.

What is needed is a solution comprising multiple level pie menus without the drawbacks of the prior art. Whatever the precise merits, features, and advantages of the above cited references, none of them achieve or fulfills the purposes of the present invention. Accordingly, it is an object of the present invention to provide for a multiple level pie menu graphical user interface.

It is another object of the present invention to provide for a concentric pie menu system.

It is an additional object of the present invention to place most frequently selected items nearest the center of concentric pie menus.

It is an additional object of the present invention to place categories towards the center and sub-categories towards exterior levels of pie menus.

It is an additional object of the present invention to split pie sectors as they extend away from the center level into additional hierarchically related menu items.

It is an additional object of the present invention to include irregularly shaped pie menus.

These and other objects are achieved by the detailed description that follows.

SUMMARY OF THE INVENTION

A graphical user interface includes a plurality of pie menu levels concentrically arranged. Located within the center most section, hereafter level 1, are menu selections generally of greater importance, highest probability of use, historical favorites, category headings, tabs from a tab menu, as well as other preselected criteria.

In a first embodiment, two or more pie menu levels are arranged concentrically with no direct relationship between levels.

In a second embodiment, two or more pie menu levels are arranged concentrically with each outer pie section related hierarchically with a corresponding inner level pie section and arranged within a common sector.

In a third embodiment, two or more pie menu levels are arranged concentrically as per the second embodiment, but with a reverse hierarchical relationship.

In a fourth embodiment, two or more pie menu levels are arranged concentrically with cursor selection located at a distance from the concentric pie menus.

BRIEF DESCRIPTION OF THE DRAWINGS

FIG. 9 illustrates an irregularly shaped hierarchical multiple level menu system.

DESCRIPTION OF THE PREFERRED EMBODIMENTS

Figure 1:
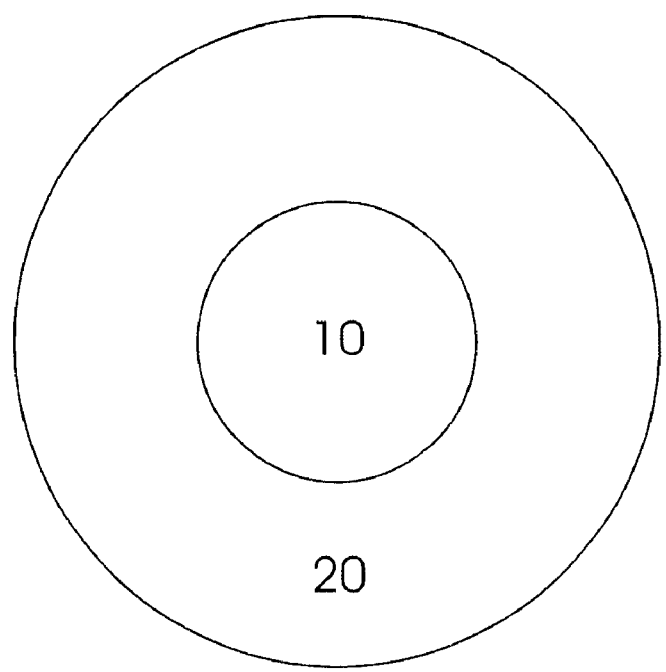
FIG. 1 illustrates a multiple level concentric menu system.

While this invention is illustrated and described in a preferred embodiment, the device may be produced in many different configurations, forms, and materials. There is depicted in the drawings, and will herein be described in detail, a preferred embodiment of the invention, with the understanding that the present disclosure is to be considered as an exemplification of the principles of the invention and the associated functional specifications of the materials for its construction and is not intended to limit the invention to the embodiment illustrated. Those skilled in the art will envision many other possible variations within the scope of the present invention.

FIG. 1 illustrates a multiple level concentric menu system. Level 1 comprises a menu item 10 surrounded by a level 2 menu item 20. Throughout the drawings, menu items are labeled as numerals, however these numerals are implemented as text, icons or other symbols generally known and used as menu items. In the FIG. 1 configuration, the menu item of greater importance, highest popularity based on predetermined criteria or highest frequency of use based on a historical analysis, is placed in the level 1 circle 10. Level 2 receives a secondary menu item 20 of less importance, frequency of use, etc.

Figure 2:
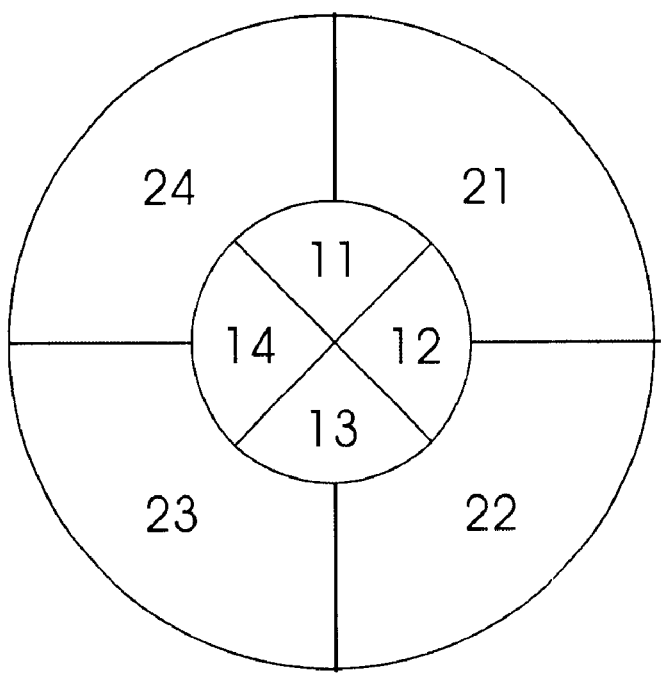
FIG. 2 illustrates a multiple level concentric pie menu.

FIG. 2 illustrates a multiple level pie menu. As with the concentric menu system of FIG. 1, the menus are separated into multiple levels of importance. However, in this configuration level 1 is split into multiple menu selections 11, 12, 13 and 14. Each of the menu selections are of generally equal levels of importance and frequency of use. For example, menu items 11, 12, 13, and 14 are "cut", "copy", "paste", and "delete". Level 2 menu items are also split into multiple selections 21, 22, 23, and 24, and are reserved for less frequently used selections such as "margins", "footers", "headers", and "line numbering", respectively. Within each level, menu items of highest frequency of use are generally placed in the upper and right-most locations (menu items 11 and 21) to facilitate the quickest recognition and selection thereof.

In an alternative embodiment, the menu items in level 2 are made dynamic. For example, if 11, 12, 13, and 14 are general menu headings such as "File", "Edit", "View", and "Insert", a selection of any one heading produces the related sub-headings in the level 2 menu selections. A selection by the user of menu item "File" 11 generates menu sub-items "New" 21, "Open" 22, "Close" 23, and "Save" 24, respectively. While the number of level 1 and level 2 menu items is illustrated and described as four items each, the implementation of the invention should not be limited thereto. Any number of divisions are possible for each level limited only by complexity and clarity considerations.

Figure 3:
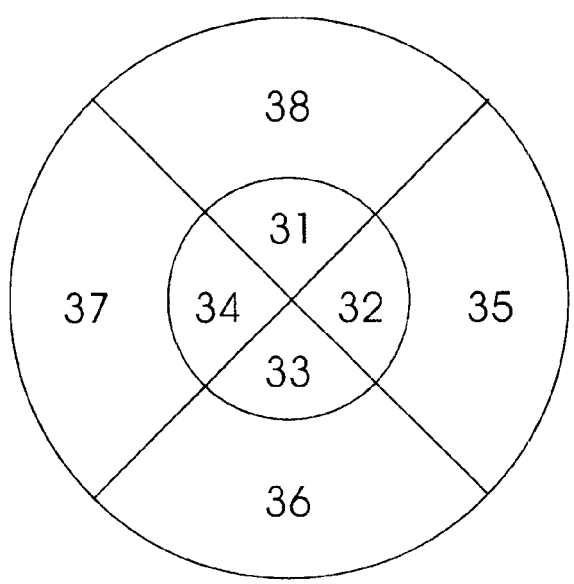
FIG. 3 illustrates a hierarchical multiple level concentric pie menu system.

FIG. 3 illustrates a hierarchical multiple level menu system. In this preferred embodiment, level 1 menu items 31, 32, 33, and 34 share a common sector with level 2 menu selections 35, 36, 37, and 38, respectively. Menu items 31 and 38, as well as other sector pairs, retain a hierarchical relationship. Menu items of level 1 are parent menu items and level 2 are child menu items. In an example, menu item 31 is the "Help" menu general heading and 38 is a subheading such as "Help table of contents". As with earlier embodiments, each of the levels are divisible by one or more divisions. A common application of the embodiment of FIG. 3 is a tabbed card catalog implementation. Menu items 31, 32, 33, and 34 represent the tabs on a plurality of overlapping levels, much the same as cards in a card catalog. Each level 2 menu item represents at least one listed item on each card. Each level 2 sector is divisible into any number of choices.

Figure 4:
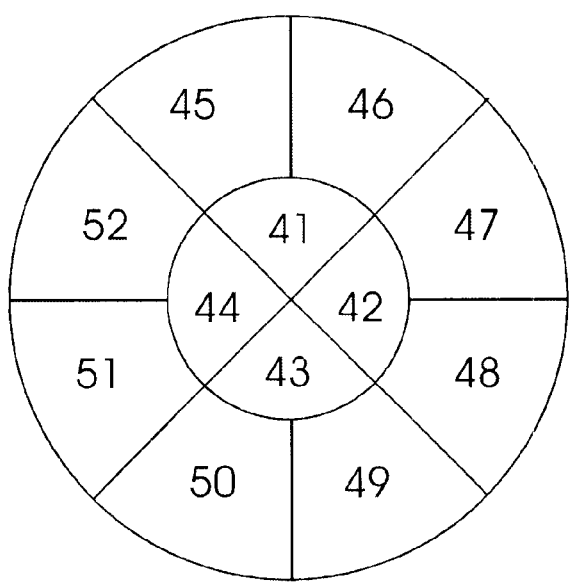
FIG. 4 illustrates a hierarchical multiple level pie menu system with a second level of granularity.

FIG. 4 illustrates a hierarchical multiple level menu system with a second level of granularity. In this variation, level 1 comprises a plurality of menu item selections 41, 42, 43, and 44. Each level 2 menu item within the same sector is then divided into two sections 45/46, 47/48, 49/50, and 51/52, respectively. This embodiment lends itself to the well known binary tree hierarchical relationship. Additional concentric levels are divided to satisfy $2^{n+1}$, where n=level number. Menu items are selected based on a flow of two new choices for each level extending from the center. While the binary tree menu example has been described above, the two choices per level are not to be limited to such a hierarchical relationship, but rather, in an alternate variation, are two choices not related to each other or, in another variation, a non-binary family tree relationship(i.e. more than two choices per level).

Figure 5:
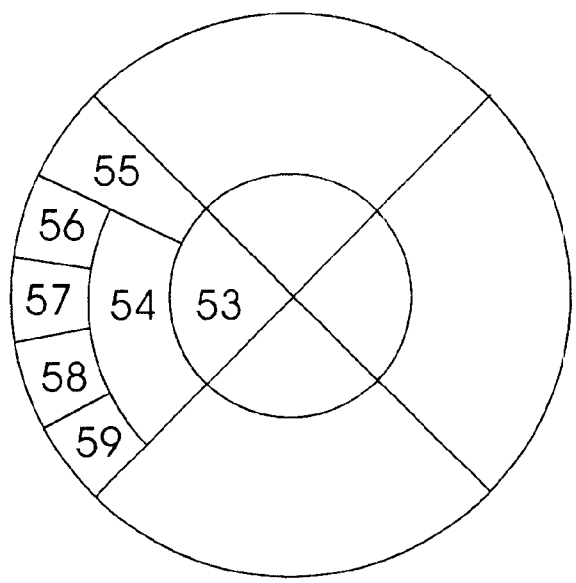
FIG. 5 illustrates a hierarchical multiple level menu system with a mixed second and third level of granularity.

FIG. 5 illustrates a hierarchical multiple level menu system with mixed second and third levels of granularity. Level 1 menu item 53 forms a hierarchical relationship with level 2 menu items 54 and 55. A series of nested level 3 menu items 56, 57, 58, and 59 are formed in a hierarchical relationship with menu item 54.

In an alternative variation of FIG. 5, Level 1 menu item 53 is represented as an approval or submission button for an interactive dialog box or form. Level 2 menu items 54 and 55 are various options which can be simultaneously and independently selected to define the action(s) which will be performed when the form is submitted. Also, a series mutually exclusive options are represented by level 3 menu items 56, 57, 58, and 59. An example use of this variation is the process of submitting a printer job. The concentric dialog box displays the options available for selection and allows the user to easily find and click on alternatives such as paper size, paper orientation, printer destination and print resolution.

Figure 6:
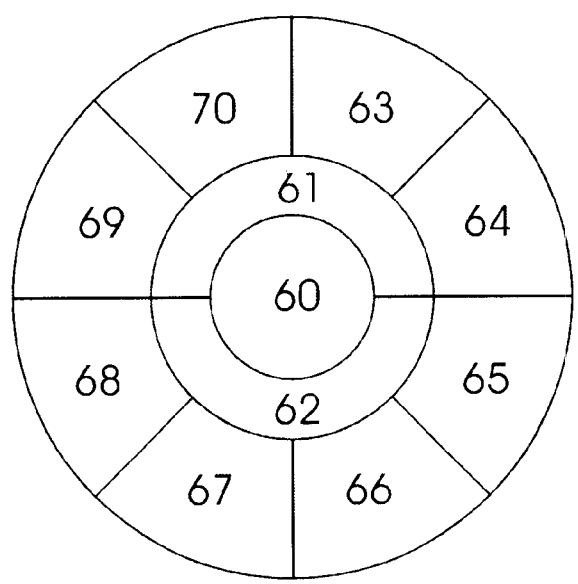
FIG. 6 illustrates a hierarchical multiple level menu system with a second and third level of granularity.

FIG. 6 also illustrates a hierarchical multiple level menu system with second and third levels of granularity. In this embodiment, two concentric levels surround a single level 1 menu item 60. In this configuration, menu choices are configured in symmetrically patterned levels.

Figure 7:
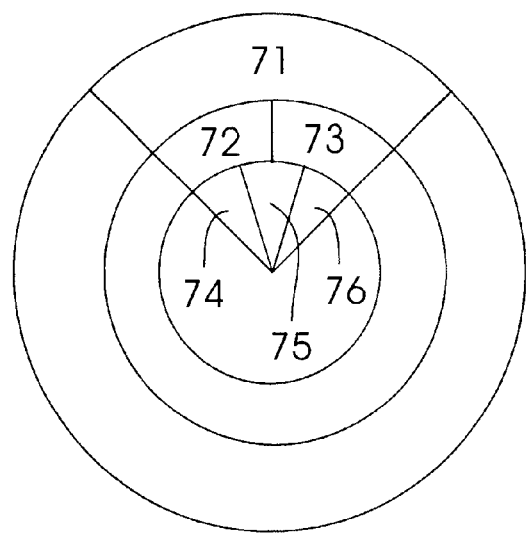
FIG. 7 illustrates a reverse hierarchical multiple level menu system with mixed second and third levels of granularity.

FIG. 7 illustrates a reverse hierarchical multiple level menu system with mixed second and third levels of granularity. In this alternative embodiment, the general guidelines for menu item placement within the concentric levels is reversed from that described heretofore. Level 1 menu items are placed in the outermost ring. A general heading item 71 is placed in the outer ring. Within the common sector of 71 is placed level two menu items 72 and 73 and level 3 menu items 74, 75, and 76.

Figure 8:
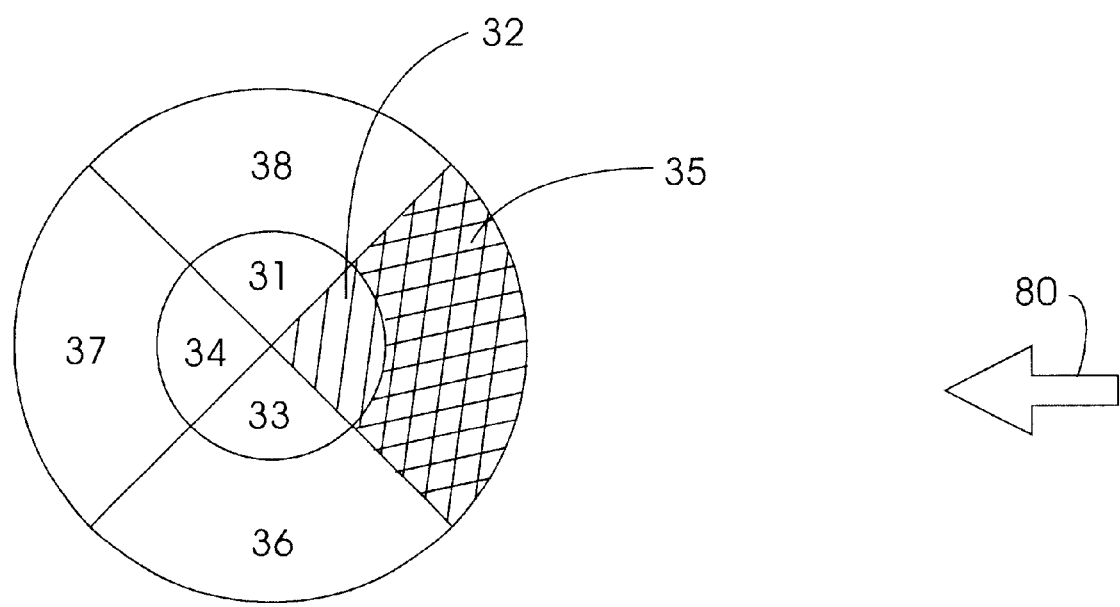
FIG. 8 illustrates a hierarchical multiple level menu system with distanced cursor control.

FIG. 8 illustrates a hierarchical multiple level menu system with distanced cursor control. In a typical embodiment, each menu item is selected by direct placement of a cursor over the item and activation by an input device input such as a right mouse click or double click. In FIG. 8, cursor 80 is located at a distance from the pie menu system of the present invention. A first mouse click selects the pie menu. Level 1 menu item 32 is highlighted when the cursor is located proximate to the sector. If the cursor is moved upward, sector 31 becomes highlighted, downward highlights sector 36, and movement to the left highlights sector 34. A second mouse click selects level 2 sectors 35, 36, 37, and 38 in a similar manner.

Figure 9:
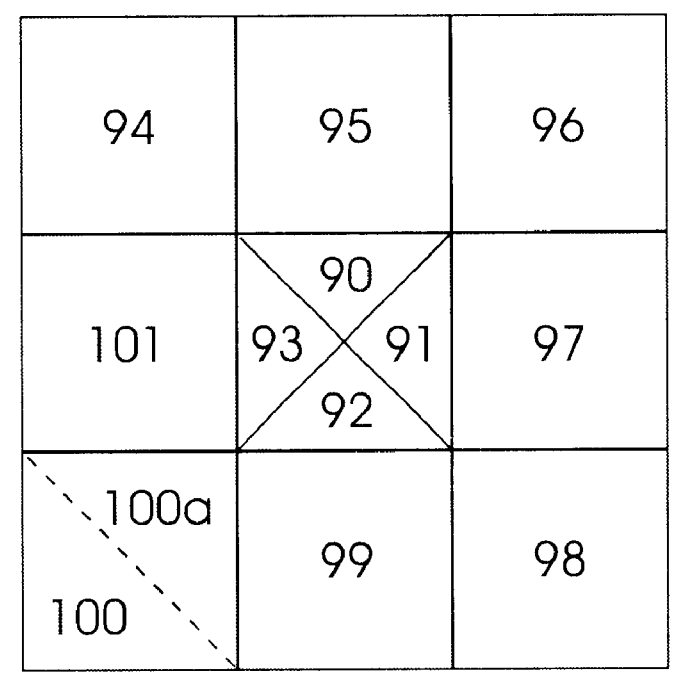

FIG. 9 illustrates an irregularly shaped hierarchical multiple level menu system. The multiple level pie menus as illustrated in FIGS. 1–8 are, in alternative embodiments, implemented in various concentric geometric shapes. FIG. 9 shows a rectangular level 1 comprising elements 90, 91, 92, and 93 with surrounding rectangular level 2 menu items 94, 95, 96, 97, 98, 99, 100, and 101. Menu item 100 is shown with alternative triangle shape 100a to illustrate that the menu items are selectable in size and shape according to the application chosen. Geometric shapes including both straight and curved lines, as well as combinations and variations thereof, are considered within the scope of the present invention as long as they retain the multiple level pie menu item relationships of the present invention. In addition, sectors and/or levels are shaded with colors and/or textures to highlight commonly grouped menu items or distinguish between menu items.

The present invention is equally implemented on IBM® compatible PC's, mainframes, portable computers, Macintosh®, UNIX® or other equivalent computer systems with computer displays or televisions screens adapted to process computer information. In addition, the pie menu systems of the present invention are universally applicable to all types of software including, but not limited to: operating systems, spreadsheets, word processors, e-mail, browsers, entertainment products such as games including virtual reality embodiments.

CONCLUSION

A system and method has been shown in the above embodiments for the effective implementation of a multiple level pie menu GUI. While various preferred embodiments have been shown and described, it will be understood that there is no intent to limit the invention by such disclosure, but rather, it is intended to cover all modifications and alternate constructions falling within the spirit and scope of the invention as defined in the appended claims. The present invention should not be limited by size, shape, position on a computer display, number of levels, number of menu items, number of sectors, colors or textures, and can be implemented on any computer display. In addition, the pie menus are implemented as pop-up menus, fixed menus, context specific menus, dialog boxes or equivalent structures.

I claim:

1. A computer based menu system comprising a plurality of levels of software menu items, said system comprising:

a first pie menu comprising a first grouping of said menu items, said first grouping of menu items comprising one or more items, said items dynamically selected based on importance, said importance including any of frequency of use, popularity, historical favorites, and positioned based on a relationship between individual items and items between said levels;

at least a second pie menu comprising a second grouping of menu items formed concentrically and essentially encapsulating said first grouping of menu items, said at least second grouping of menu items comprising secondary menu items, said secondary menu items dynamically selected based on importance, said importance including any of frequency of use, popularity, historical favorites, and positioned based on a relationship between individual items within a common level and items between said levels.

2. A computer based menu system as per claim 1, wherein said first and second groupings comprise $2^{n+1}$ menu items, where n=grouping number.

3. A computer based menu system as per claim 1, wherein each of said groupings of menu items are independently and simultaneously selectable.

4. A computer based menu system as per claim 1, wherein said menu items are independently and simultaneously selectable as a dialog entry form and said first grouping includes a submission button.

5. A computer based menu system, as per claim 1, wherein said menu items are dynamically selected based on frequency of use as determined by an historical analysis.

6. A computer based menu system, as per claim 1, wherein most frequently used menu items are generally positioned in upper and right locations within each of said groupings.

7. A computer based menu system, as per claim 1, wherein each grouping may further comprise mixed levels of granularity.

8. A computer product, including computer code for implementing a multiple level pie menu interface comprising:

computer code generating a first pie menu comprising a first grouping of menu items, said first grouping of menu items comprising one or more menu items, said items dynamically selected and positioned based on frequency of use as determined by historical analysis;

computer code generating at least a second pie menu comprising a second grouping of menu items formed concentrically and essentially encapsulating said first grouping of menu items, said at least second grouping of menu items dynamically selected and positioned based on frequency of use relative to said first and second groupings.

9. A computer product, including computer code for implementing a multiple level pie menu interface as per claim 8, wherein said first and second groupings comprise $2^{n+1}$ menu items, where n=group number.

10. A computer product, including computer code for implementing a multiple level pie menu interface as per claim 8, wherein each of said groupings of menu items are independently and simultaneously selectable.

11. A computer product, including computer code for implementing a multiple level pie menu interface as per claim 8, wherein said menu items are independently and simultaneously selectable as a dialog entry form and said first grouping includes a submission button.

12. A computer product, including computer code for implementing a multiple level pie menu interface, as per claim 8, wherein most frequently used menu items are dynamically placed in innermost groups of said concentric groupings and generally positioned in upper and right locations within each of said groupings.

13. A computer product, including computer code for implementing a multiple level pie menu interface, as per claim 8, wherein each grouping may further comprise mixed levels of granularity.

14. A computer based method for implementing a multiple level pie menu interface comprising:

dynamically arranging a first pie menu comprising a first grouping of menu items, said first grouping of menu items comprising a subset of one or more items from a set of menu items, said subset of items dynamically selected and positioned based on frequency of use as determined by an-historical analysis;

dynamically creating and positioning additional groupings of menu items, each of said additional groupings formed concentrically and sequentially and essentially encapsulating said first grouping of menu items, said additional groupings of menu items comprising less frequently used menu items relative to said first grouping of menu items.

15. A computer based method for implementing a multiple level pie menu interface as per claim 14, wherein said first and second groupings comprise $2^{n+1}$ menu items, where n=grouping number.

16. A computer based method for implementing a multiple level pie menu interface as per claim 14, wherein said menu items are independently and simultaneously selectable.

17. A computer based method for implementing a multiple level pie menu interface as per claim 14, wherein said menu items are independently and simultaneously selectable as a dialog entry form and said first grouping includes a submission button.

18. A computer based method for implementing a multiple level pie menu interface, as per claim 14, wherein said most frequently used menu items are generally positioned in upper and right locations of each of said groupings.

19. A computer based method for implementing a multiple level pie menu interface, as per claim 14, wherein each grouping may further comprise mixed levels of granuality.

* * * * *